(12) United States Patent
Kwak et al.

(10) Patent No.: US 8,899,400 B2
(45) Date of Patent: Dec. 2, 2014

(54) CHECK DEPOSIT APPARATUS

(75) Inventors: Jae Hoon Kwak, Seoul (KR); Woo Ho Lee, Seoul (KR)

(73) Assignee: Nautilus Hyosung Inc., Seoul (KR)

( * ) Notice: Subject to any disclaimer, the term of this patent is extended or adjusted under 35 U.S.C. 154(b) by 167 days.

(21) Appl. No.: 13/140,406

(22) PCT Filed: Dec. 23, 2009

(86) PCT No.: PCT/KR2009/007744
§ 371 (c)(1),
(2), (4) Date: Jun. 16, 2011

(87) PCT Pub. No.: WO2010/074517
PCT Pub. Date: Jul. 1, 2010

(65) Prior Publication Data
US 2011/0290617 A1    Dec. 1, 2011

(30) Foreign Application Priority Data

Dec. 24, 2008  (KR) .................. 10-2008-0133212

(51) Int. Cl.
| | |
|---|---|
| *G07F 7/04* | (2006.01) |
| *G06K 7/00* | (2006.01) |
| *G06K 9/00* | (2006.01) |
| *G07D 7/00* | (2006.01) |
| *G07F 19/00* | (2006.01) |
| *G06Q 20/04* | (2012.01) |
| *G07D 11/00* | (2006.01) |

(52) U.S. Cl.
CPC ............ *G07F 19/202* (2013.01); *G06Q 20/042* (2013.01); *G07D 11/0093* (2013.01); *G07F 19/20* (2013.01)
USPC ........... 194/207; 194/206; 271/227; 271/259; 271/261; 271/265.02; 271/265.03

(58) Field of Classification Search
USPC ................... 194/206, 207; 209/534; 382/135; 271/227, 258.01, 259, 261, 265.01, 271/265.02, 265.03, 250
See application file for complete search history.

(56) References Cited

U.S. PATENT DOCUMENTS

| | | | |
|---|---|---|---|
| 2002/0063384 A1* | 5/2002 | Quesnel ........................ | 271/270 |
| 2002/0153291 A1* | 10/2002 | Otsuka .......................... | 209/534 |
| 2003/0118228 A1* | 6/2003 | Mennie et al. ................ | 382/135 |
| 2006/0177117 A1* | 8/2006 | Morisaki et al. .............. | 382/135 |
| 2007/0000750 A1* | 1/2007 | Uno et al. ..................... | 194/207 |
| 2007/0007712 A1 | 1/2007 | Gotoh et al. | |
| 2007/0108013 A1* | 5/2007 | Nago et al. .................... | 194/302 |
| 2007/0114717 A1* | 5/2007 | Taniyama ................. | 271/265.01 |

FOREIGN PATENT DOCUMENTS

| | | |
|---|---|---|
| CN | 1971637 | 5/2007 |
| JP | 2002-236961 A | 8/2002 |
| JP | 2005-255407 A | 9/2005 |
| JP | 2008-015813 A | 1/2008 |

OTHER PUBLICATIONS

International Search Report, PCT/KR2009/007744, Aug. 9, 2010, 4 Pages (with English translation).
Chinese Office Action dated Sep. 11, 2013 for Chinese Patent Application No. CN 200980152698.6, 7 Pages.

\* cited by examiner

*Primary Examiner* — Jeffrey Shapiro
(74) *Attorney, Agent, or Firm* — Fenwick & West LLP

(57) ABSTRACT

The check deposit apparatus of the present invention comprises an insertion part that is used to insert a check from outside for deposit, a feed part furnished with a feed roller that feeds the placed check along a feed path, an alignment part furnished with an alignment roller that feeds the check fed from the feed part to one side of the feed path and also aligns it, a check reading part that reads information of the check that has been aligned by the alignment part, first and second sensor groups that judge whether the check inserted into the insertion part has a specification that enables it to be fed and processed toward the alignment part normally, a third sensor group that judges whether the check aligned in the alignment part has a specification that enables it to be read and processed normally in the check reading part, and a control part that judges whether to deposit or return the check in question based on the information sensed by the first and second group or third sensor group. According to the invention, a check that has been erroneously placed or does not meet specifications may be readily returned to the user.

6 Claims, 7 Drawing Sheets

CHECK DEPOSIT APPARATUS

TECHNICAL FIELD

The present invention relates to a check deposit apparatus, and more particularly, to a check deposit apparatus having an abnormal check sensing function for sensing and returning a check that does not meet a standard size.

BACKGROUND OF THE INVENTION

In general, an Automated Teller Machine (ATM) includes an input unit for inputting information, a screen unit for displaying financial service menu and transaction situation, and a check deposit apparatus through which a customer can insert or receive a check for deposit/withdrawal transaction. The customer deposits and withdraws a check through the check deposit apparatus.

FIG. 1 is a perspective view illustrating a part of an insertion unit and an alignment unit of a conventional check deposit apparatus.

The check deposit apparatus includes an insertion unit 10 through which a customer inserts a check from the outside or receives a check returned from the inside, and an alignment unit 30 for pushing and aligning the inserted check to one side of a feed path 20 while feeding the check inwards along the feed path 20. Further, the check deposit apparatus may further include a check reading unit (not shown) for checking genuineness and information of the fed check and a multiple sheet sensing unit (not shown) for sensing whether or not the fed check is formed of a single sheet or multiple sheets. Normally, the position of the alignment unit 30 for aligning a check is slightly biased toward a direction in which a check is pushed, e.g., toward a right side of the feed path 20.

In general, checks that are inserted at one time by a user are aligned and scanned one by one so that the genuineness and the information thereof can be checked. However, when two or more checks are overlapped, the overlapped checks may be returned to a user so that the user can insert them one by one. When the checks are returned, they are returned one by one along the feed path 20. For example, even if a user inserts five checks into the insertion unit 10 at one time, the five checks are not returned to the user at one time. Instead, the user receives the five checks consecutively one by one through the insertion unit 10.

This may cause boredom and inconvenience to the user. For that reason, it is required to develop a check deposit apparatus that can return a plurality of checks at one time when a user has inserted the plurality of checks at one time.

Meanwhile, a check may be inserted in a state that does not enable it to be fed by the alignment unit in the check deposit apparatus. For example, as shown in FIG. 2, a check 'c' folded in half along its length may be inserted into the insertion unit 10. In that case, if the check 'c' folded in half is inserted while being closely knitted to the left side of the feed path 20 where an alignment roller 31 is not installed as shown in FIG. 2, the inserted check 'c' is fed by a feed roller 12 and then remains in that state without being fed further. Moreover, as shown in FIG. 3, a damaged check (or a medium such as a name card or the like other than a check) may be inserted into the insertion unit 10. In that case as well, a check 'c' is fed by the feed roller 12 and then is stacked without reaching the alignment roller 31.

Normally, when a check in an abnormal state is inserted, it is returned by the check deposit apparatus. However, in the above-described case, the inserted check cannot be fed further and also cannot be returned to the user. Accordingly, an error message is displayed on a screen, and the apparatus cannot be used until the problem is solved by a manager. At night, a long period of time may be required until the manager comes and solves the problem, or even there is a possibility that the problem cannot be solved.

Meanwhile, a check having a non-standard size or another medium may be inserted. In that case, it can be fed but cannot be recognized as a check, which causes an error.

In an area where checks of various standard sizes are used, the feed path is designed in accordance with the various standard sizes of the checks. However, even when a check having a size smaller than the standard sizes is inserted, it is directed to the check reading unit for checking genuineness and information of the check fed along the feed path. However, such check (or an abnormal medium) cannot be read in the check reading unit and may cause an error. Therefore, it is preferable to return the check before the check is fed to the check reading unit.

As such, the malfunction of the check deposit apparatus causes inconvenience to customers and increases maintenance costs of the apparatus.

DISCLOSURE

Technical Problem

It is, therefore, an object of the present invention to provide a check deposit apparatus for sensing, in a check insertion step, whether or not an abnormal check or a check having a non-standard size is inserted and then returning the check.

Technical Solution

In accordance with the present invention, there is provided a check deposit apparatus including: an insertion unit for inserting a check from outside to deposit; a feed unit including a feed roller that feeds the inserted check along a feed path; an alignment unit including an alignment roller that feeds the check fed from the feed unit to one side of the feed path and also aligns the check; a check reading unit for reading information of the check aligned by the alignment unit; a first and a second sensor group for judging whether the check inserted into the insertion unit has a standard size that enables the check to be normally fed toward the alignment unit; a third sensor group for judging whether the check aligned in the alignment unit has a standard size that enables the check to be normally read by the check reading unit; and a control unit for determining whether to deposit or return the check in question based on the information sensed by the first and the second group or the third sensor group.

The first and the second sensor group includes a plurality of sensors for sensing a length and a width of the check inserted into the insertion unit, and the control unit, when the length or the width of the check sensed by the first and the second sensor group does not satisfy the standard size, determines the check as a check that is unable to be fed and returns the check.

The first sensor group includes a plurality of sensors for judging whether a check having a width smaller than a distance between the alignment roller and one side of the feed path is inserted.

The second sensor group includes a plurality of sensors for judging whether a check having a length smaller than a distance between the feed roller and the alignment roller is inserted.

The third sensor group includes a plurality of sensors for sensing a length and a width of the check aligned by the alignment unit, and the control unit, when the sensed length or width of the check does not satisfy the standard size, determines the check as a check that is unable to be read and returns the check.

The plurality of sensors include a reference sensor disposed at one side of the feed path, a sensor spaced apart from the reference sensor by a predetermined length in a horizontal direction, and a sensor spaced apart from the reference sensor by a predetermined width in a vertical direction.

The first to the third sensor group include optical sensors to sense whether the check is formed of a single sheet or multiple sheets.

Advantageous Effects

In accordance with the present invention, due to the sensors for sensing whether or not an abnormal check is inserted, it is possible to readily return to a user a check that cannot be fed normally by the feed unit or a check that cannot be read normally by the check reading unit. Accordingly, the inconvenience of the user can be reduced, and the malfunction of the apparatus can be prevented in advance.

BEST MODE FOR THE INVENTION

Figure 1:
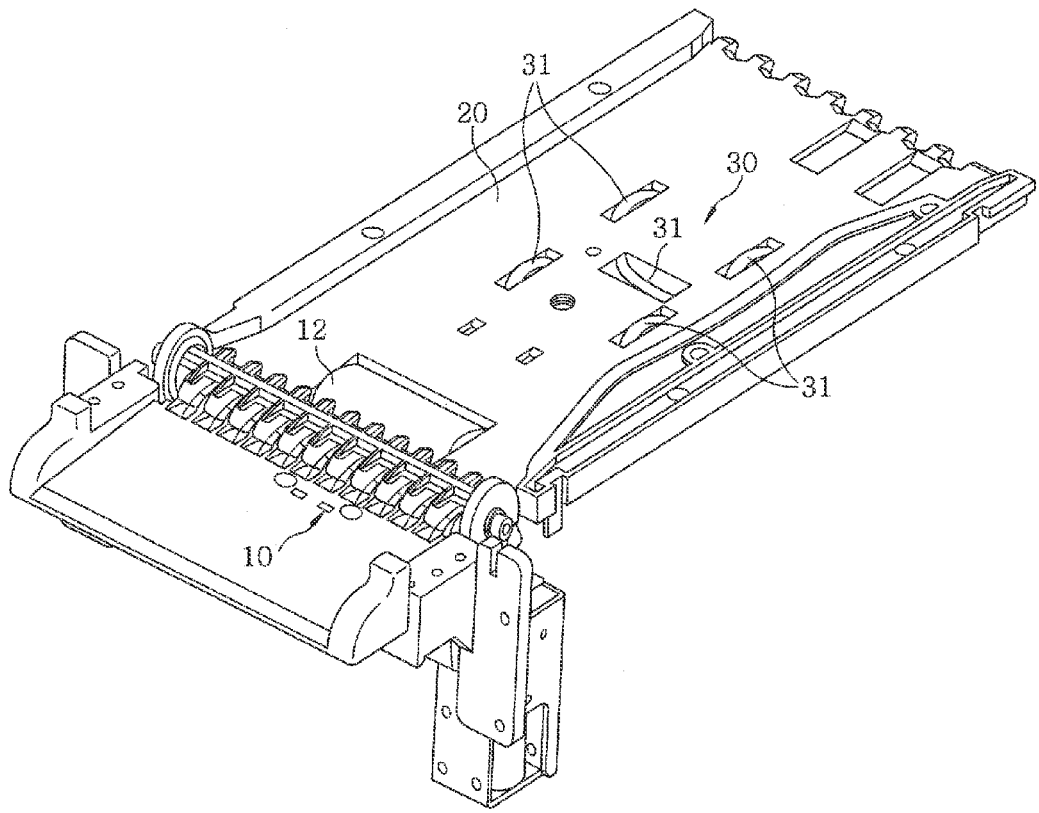
FIG. 1 is a perspective view illustrating an insertion unit and an alignment unit of a conventional check deposit apparatus.
Figure 2:
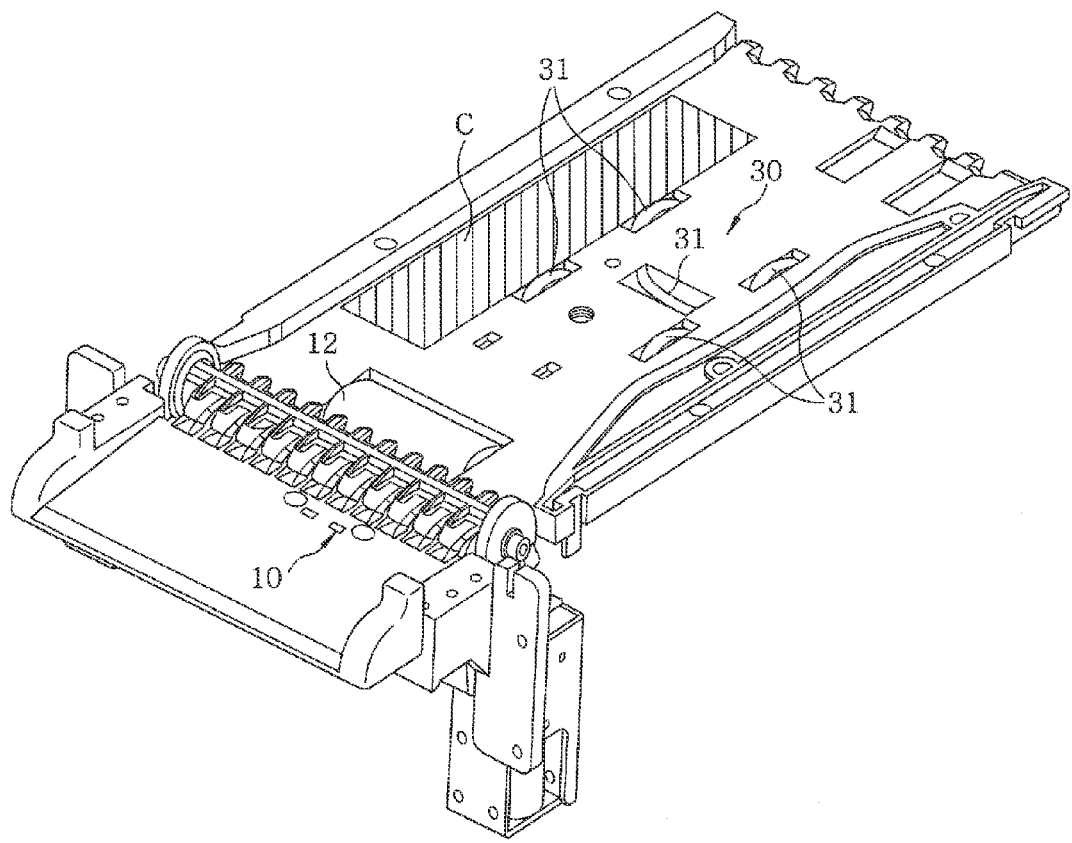
FIG. 2 shows a case in which a check is inserted in a state that does not enable it to be fed by the alignment unit in the check deposit apparatus of FIG. 1.
Figure 3:
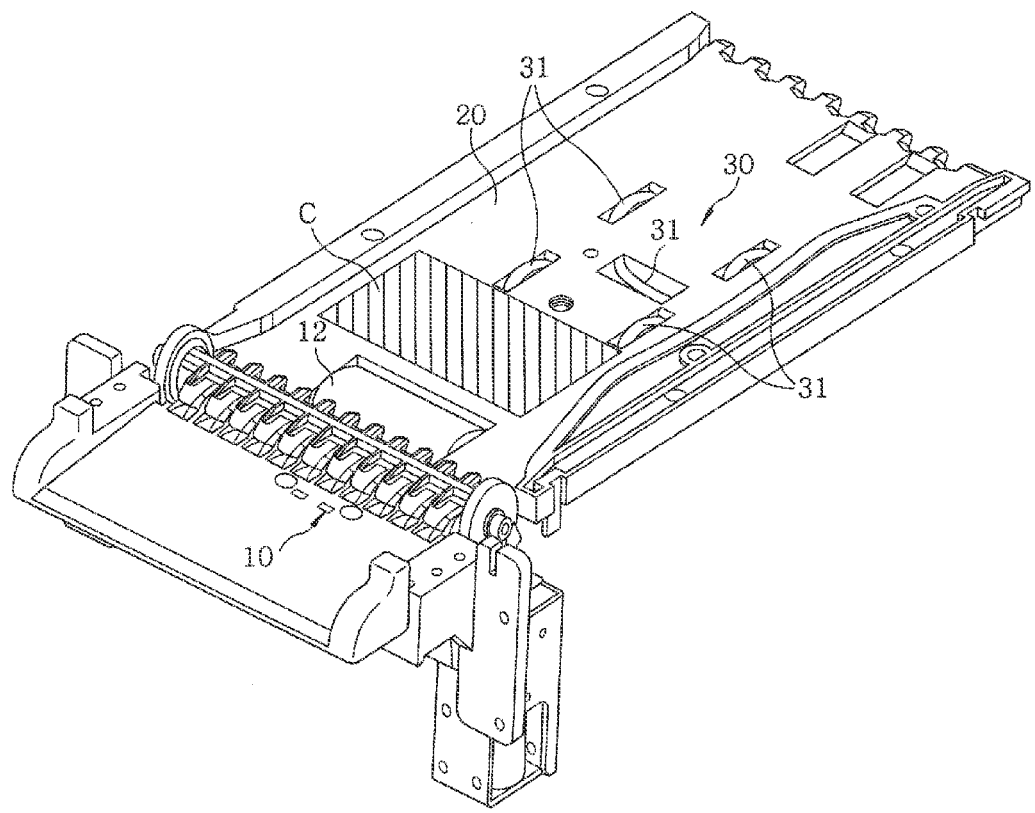
FIG. 3 shows another case in which a check is inserted in a state that does not enable it to be fed by the alignment unit in the check deposit apparatus of FIG. 1.

Hereinafter, a configuration and an operation method of a check deposit apparatus in accordance with an embodiment of the present invention will be described in detail with reference to the accompanying drawings. Throughout the drawings, like reference numerals refer to like parts.

Figure 4:
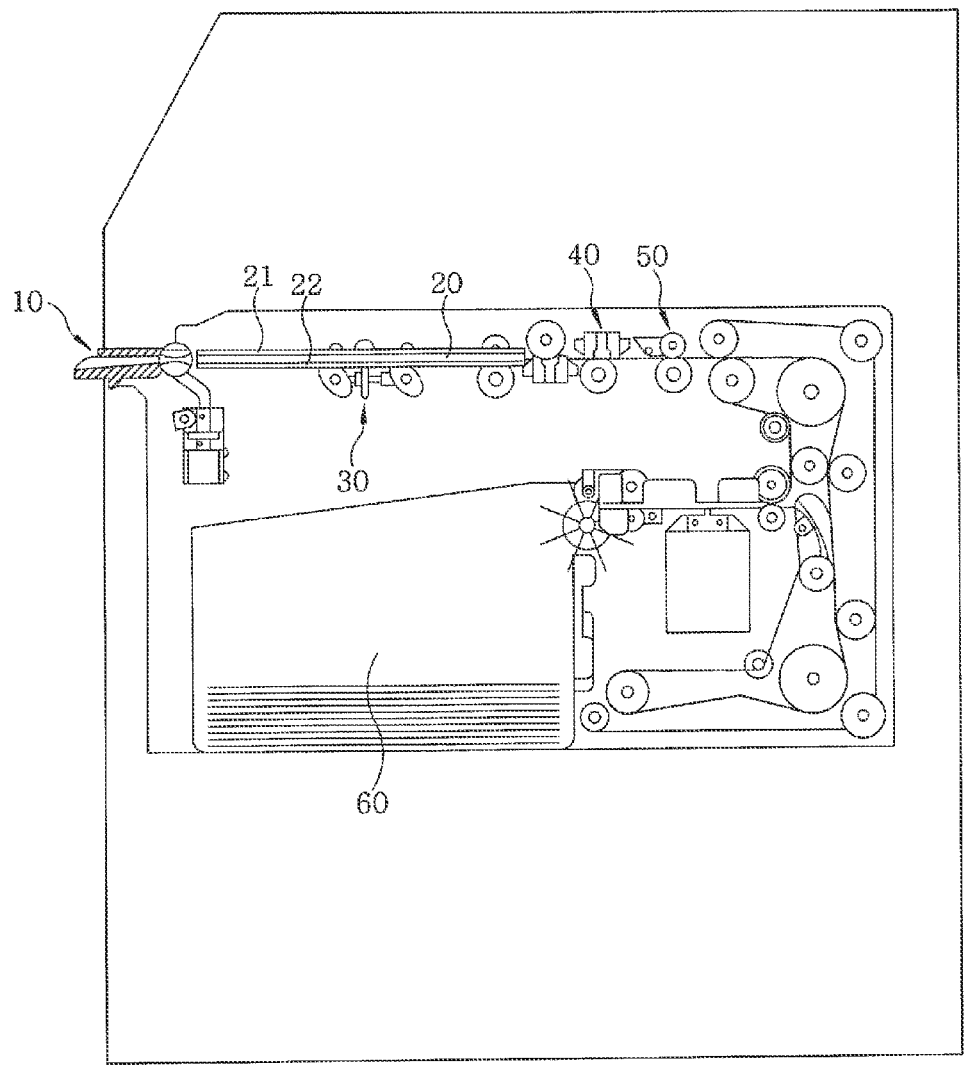
FIG. 4 is a schematic diagram showing an internal configuration of a check deposit apparatus in accordance with an embodiment of the present invention.
Figure 5:
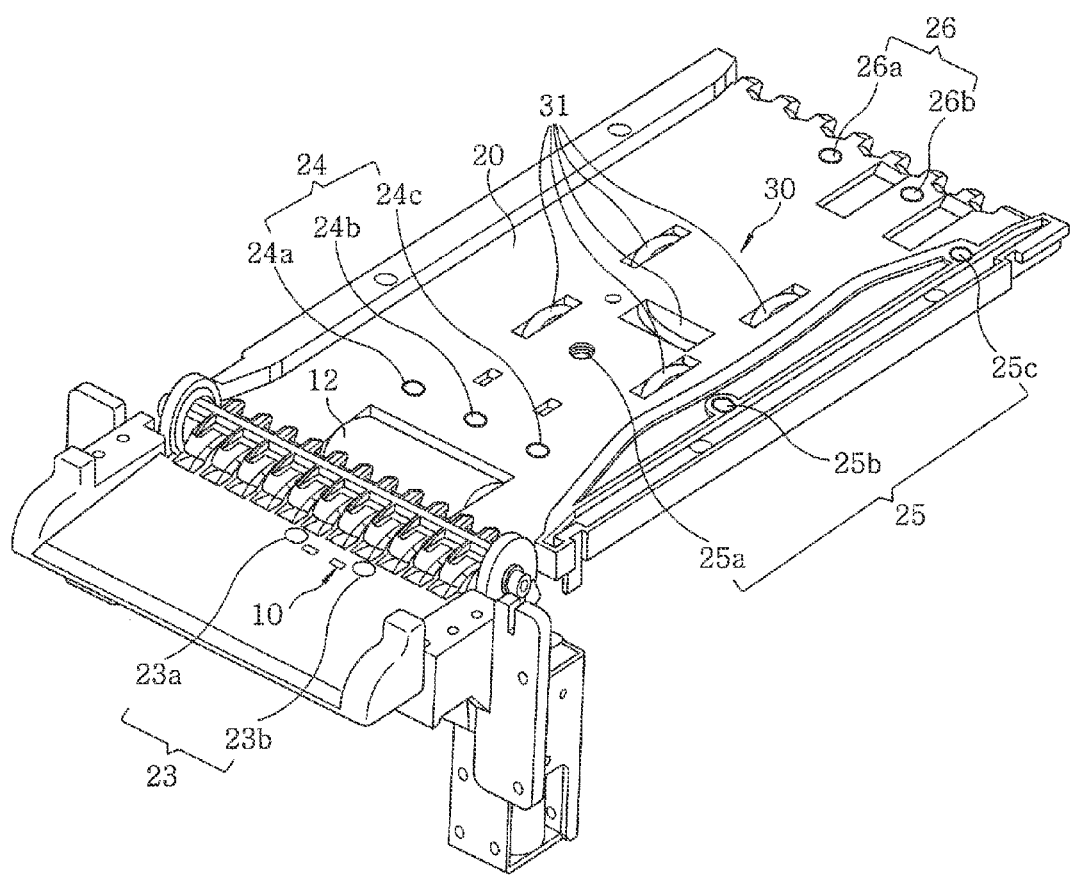
FIG. 5 is a perspective view illustrating arrangement of sensors in an insertion unit and an alignment unit of the check deposit apparatus shown in FIG. 4.
Figure 6:
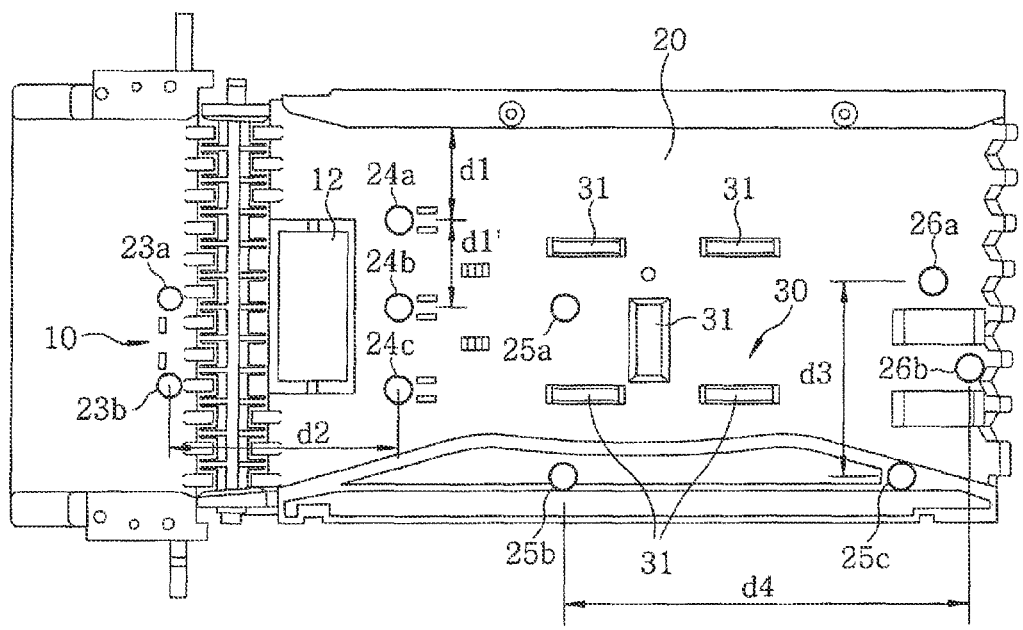
FIG. 6 is a top view illustrating distances between the sensors shown in FIG. 5.
Figure 7:
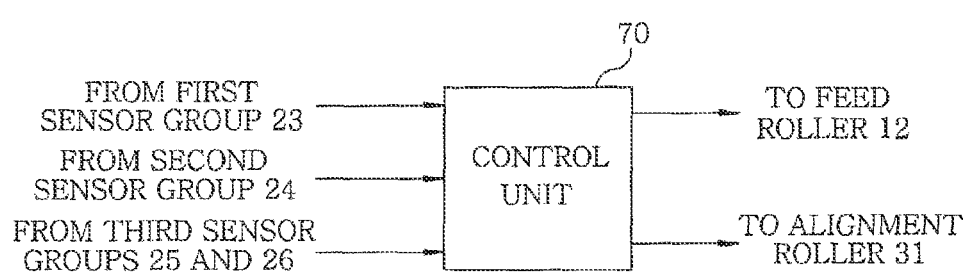
FIG. 7 shows a control unit that performs a check return process and a check deposit transaction based on sensed results of the sensors.

FIG. 4 is a schematic diagram showing an internal configuration of a check deposit apparatus in accordance with an embodiment of the present invention. FIG. 5 is a perspective view illustrating arrangement of sensors in an insertion unit and an alignment unit of the check deposit apparatus shown in FIG. 4. FIG. 6 is a top view illustrating distances between the sensors shown in FIG. 5. FIG. 7 shows a control unit that performs a check return process and a check deposit transaction based on sensed results of the sensors.

Referring to FIG. 4, a feed path 20 is formed by a space between an upper member 21 and a lower member 22 which correspond to each other. FIGS. 5 and 6 illustrate the feed path 20 on the lower member 22.

As illustrated in FIGS. 4 and 5, the check deposit apparatus for sensing an abnormal check by using sensors in accordance with the embodiment of the present invention includes an insertion unit 10 that is used for a user to insert a check from outside for deposit, a feed unit furnished with the feed path 20 and a feed roller 12 that feed the inserted check, an alignment unit 30 furnished with an alignment roller 31 that aligns the check fed from the feed unit to one side of the feed path 20, a check reading unit 40 for reading information of the check aligned in the alignment unit, a first and a second sensor group 23 and 24 for judging whether or not the check inserted into the insertion unit 10 has a standard size that enables it to be fed normally, third sensor groups 25 and 26 for judging whether the check aligned in the alignment unit 30 has a standard size that enables it to be read normally in the check reading unit 40, and a control unit 70 (see FIG. 7) for determining whether to deposit or return the check in question based on the information sensed by the first to the third sensor group.

The first and the second sensor group 23 and 24 respectively include a plurality of sensors 23a and 23b and 24a to 24c for sensing a length and a width of a check. The third sensor groups 25 and 26 include a plurality of sensors 25a to 25c and 26a and 26b for sensing a length and a width of a check. The control unit 70 is installed inside the check deposit apparatus. When at least one of the length and the width of the check sensed by the first to the third sensor group 23 to 26 does not meet the standard size, the control unit 70 determines the corresponding check as a check that cannot be fed and returns the corresponding check.

As illustrated in FIGS. 5 and 6 in detail, the second sensor group 24 is provided between the insertion unit 10 and the alignment unit 30 of the check deposit apparatus and senses whether or not an abnormal bill is inserted. Here, the abnormal bill indicates a check having an abnormally small length in the horizontal direction (including a medium such as a name card or the like other than a check) and a check having an abnormally small width in the vertical direction (e.g., a check folded in half or a check cut in half). More specifically, the second sensor group 24 senses whether or not the placed check has a width smaller than a distance between the alignment roller 31 and one side of the feed path 20. To do so, the second sensor group 24 includes three sensors 24a to 24c installed spaced apart from one another by predetermined distances d1 and d1' and arranged side by side in the vertical direction perpendicular to the horizontal direction in which a check is inserted. The number of the sensors 24a to 24c may be smaller than or equal to three, or may be greater than or equal to four.

In the insertion unit 10 of the check deposit apparatus, the first sensor group 23 for sensing whether or not the abnormal bill is inserted is installed at a predetermined distance d2 apart from the second sensor group 24. The first sensor group 23 senses whether or not a check that cannot be fed further due to its length smaller than a distance between the feed roller 12 and the alignment roller 31 is inserted.

The control unit 70 can readily return to a user a check having a length smaller than the distance d2 between the first sensor group 23 and the second sensor group 24 or a check having a width smaller than the distance d' between the sensors 24a to 24c of the second sensor group and the distance d1 between the sensor 24a of the second sensor group 24 and one side of the feed path based on the sensing results of the sensor groups 23 and 24.

As illustrated in FIG. 7, when an abnormal check is sensed by the first and the second sensor group 23 and 24, the control unit 70 can return the check by generating, e.g., a control signal for reversely rotating the feed roller 12 toward the insertion unit 10. In contrast, when a check that meets the standard size is sensed by the first and the second sensor group 23 and 24, the control unit 70 can feed the check toward a storing unit 60 for storing a check so that the check can be deposited.

Further, as illustrated in FIG. 6, the third sensor groups 25 and 26 include one or more sensors 25a, 25b and 26b for sensing a length of a check in order to judge whether or not an aligned check meets the standard size that enables it to be read normally by the check reading unit 40 and one or more sensors 25b, 25c and 26a for measuring a width of a check. The control unit 70 controls a check having a length or a width that does not meet the standard size to be returned. Here, a check having a size smaller than a distance d3 between the sensors 25a and 25b and a distance d4 between the sensors 25a or 25b and 26b or 26a can be determined as a check that does not meet the standard size, according to whether or not both the length and the width of the aligned check are sensed by the third sensor groups 25 and 26. In other words, the distances d3 and d4 between the sensors can be defined in correspondence to the standard size of the smallest check among the checks that can be read by the check reading unit 40. For example, when the sensor 25b provided at one side of the feed path is set as a reference sensor, a check that can be sensed by all of three sensors, i.e., the sensor 25b, the sensor 26b spaced apart from the sensor 25b by a predetermined distance, and the sensor 26a spaced apart from the sensor 25b by a predetermined distance, can be judged as a check that meets the standard size.

In the same manner, when the check that does not meet the standard size is sensed by the third sensor groups 25 and 26, the control unit 70 can return the check by generating, e.g., a control signal for reversely rotating the alignment roller 31 and the feed roller 12 toward the insertion unit 10, as illustrated in FIG. 7. When the check that meets the standard size is sensed by the third sensor groups 25 and 26, the control unit 70 can feed the check toward the storing unit 60 so that the check can be deposited.

Each sensor in the first to the third sensor group 23 to 26 can be configured with an optical sensor including a pair of light emitting unit and light receiving unit. For example, the light emitting unit of the optical sensor can be positioned at the lower member 22 forming the feed path 20, and the light receiving unit can be positioned at the upper member 21. Each sensor in the first to the third sensor group 23 to 26 may also be configured to sense whether or not the check is formed of a single sheet or multiple sheets. For example, whether or not the check is formed of a single sheet or multiple sheets can be sensed by comparing an amount of optical signal received by the light receiving unit with a reference value, the optical signal being generated from the light emitting unit of each sensor in the first to the third sensor group 23 to 26, irradiated to the check and then received by the light receiving unit.

When the check deposit apparatus of the present invention is configured to allow a user to deposit checks one by one, a plurality of checks inserted at one time is controlled to be returned. When a user inserts a plurality of checks at one time, one of the sensor groups 23 to 26 senses whether or not the check is formed of a single sheet or multiple sheets. When it is sensed by the sensor that two or more checks have been inserted, the control unit 70 stops the operation of other units and readily returns the checks to the user. The aforementioned multiple sheet sensing structure is well known in the technical field of the present invention, so that the further description of the method for sensing whether or not the check is formed of a single sheet or multiple sheets by using sensors will be omitted.

Figure 8:
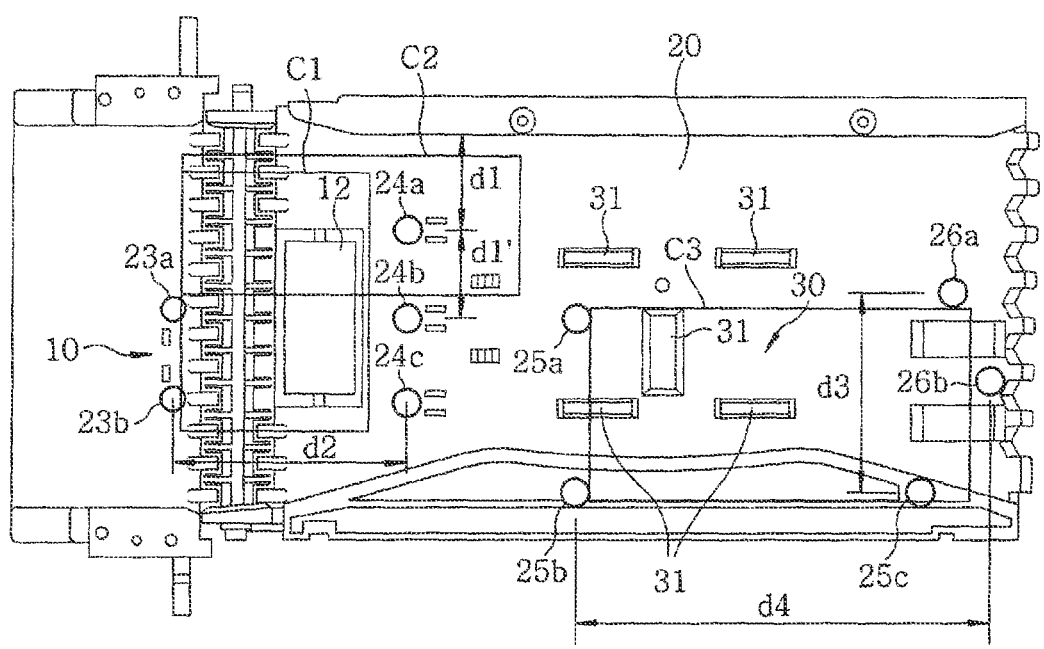
FIG. 8 is a top view illustrating a case in which an abnormal check is inserted in a check deposit apparatus in accordance with the embodiment of the present invention.

Hereinafter, an operation method for sensing and returning an abnormal check or a check having a non-standard size in a check deposit apparatus in accordance with the embodiment of the present invention will be described with reference to FIG. 8. FIG. 8 is a top view illustrating an abnormal check in a check deposit apparatus in accordance with the embodiment of the present invention. Here, a check c1 indicates a check having an abnormally small length in a horizontal direction (including a medium such as a name card or the like other than a check); a check c2 indicates a check having an abnormally small width in a vertical direction (e.g., a check folded in half or a check cut in half); a check c3 indicates a check that does not meet a predetermined standard size in the vertical and horizontal direction and has a size smaller than the standard size.

The first and the second sensor group 23 and 24 may have a function of detecting whether or not the checks c1 and c2 have been inserted in a state that does not enable them to be fed. For example, when a check c2 folded in half is inserted while being closely knitted to the left side (upper side in FIG. 7) of the feed path 20 where the alignment roller 31 does not reach, the inserted check is fed by the feed roller 12 and passes through the sensor 24a. When the check is inserted in the state that does not enable it to be fed, the check is detected only by the left sensor 24a among the three sensors, whereas it is not detected by the other two sensors 24b and 24c. In that case, the control unit 70 determines that the check has been inserted in a state that does not enable it to be fed by the alignment unit 30 and readily returns the check to the user. Further, a message for guiding a normal insertion of a check is displayed on a screen. In other words, only when the check is detected by two or more sensors among the three sensors 24a to 24c, the control unit determines that the check has been inserted in a state that enables it to be fed, and performs a next process.

As described above, the first sensor group 23 is installed at a predetermined distance apart from the second sensor group 24. When the check c1 that has passed through the first sensor group 23 is fed by the feed roller 12 and then is sensed by the second sensor group 24 without being sensed by the first sensor group 23, the check c1 is determined as an abnormal check. In other words, as shown in FIG. 8, when a length of the check c1 is smaller than the distance d2 between the first and the second sensor group 23 and 24, the check cannot be further fed in the alignment unit 30. Hence, the control unit returns the check readily to the user and displays on the screen the message for guiding the normal insertion of a check.

The check that has passed through the first and the second sensor group 23 and 24 is fed until it is sensed by the sensor 25a of the third sensor group. When the check is sensed by the sensor 25a, it is pushed and aligned to one side by the alignment roller 31 of the alignment unit.

When the check is aligned, the third sensor groups 25 and 26 sense whether or not the aligned check meets the standard size. As illustrated in FIG. 8, when the check c3 has a width smaller than the distance d3 between the sensor 26a and the sensors 25b and 25c in the horizontal direction, or when the check c3 has a length smaller than the distance d4 between the sensor 26b and the sensors 25a and 25b in the vertical direction, the check c3 is determined as a check that does not meet the standard size. The control unit returns the check c3 to the user without feeding it further. Only one of the sensors 25a and 25b may be used to judge a length of a check. Similarly, only one of the sensors 25b and 25c may be used to judge a width of a check.

As such, the check deposit apparatus of the present invention has sensors capable of checking a size of an inserted check (or an abnormal medium other than a check). Specifically, the sensors include a sensor for sensing whether or not a check that cannot be fed normally is inserted, and a sensor for sensing whether or not a check that cannot be read normally is inserted. Therefore, when a check is erroneously inserted, it can be readily returned to a user. Accordingly, the inconvenience of the user can be reduced, and the maintenance costs can be decreased by preventing malfunction of the apparatus.

The structure and the arrangement of the sensors may be variously modified without departing from the scope of the invention. It should be understood by those skilled in the art that the present invention can be variously modified without departing from the scope of the invention without being limited to the above-described embodiments. These modifications are also included in the scope of the invention defined in the following claims.

The invention claimed is:

1. A check deposit apparatus comprising:
   an insertion unit receiving a check for depositing within the check deposit apparatus;
   a feed roller adjacent to the insertion unit and configured to convey the received check along a feed path;
   at least one alignment roller placed along the feed path subsequent to the feed roller and configured to align the check conveyed by the feed roller towards a side of the feed path;
   a check reading unit configured to read information from the check aligned by the alignment roller;
   a first group of sensors placed adjacent to the insertion unit at a side opposite to the feed roller, the first group of sensor configured to sense whether a length of the check is smaller than a predetermined length;
   a second group of sensors placed between the feed roller and the alignment roller at a redetermined distance from the first rou of sensors in a direction of the feed path, the second group of sensors is configured to determine whether the check has a width narrower than a distance between the at least one alignment roller and one side of the feed path;
   a third group of sensors placed in the feed path subsequent to the second group of sensors, the third group of sensors configured to sense whether dimensions of the check matches predetermined dimensions; and
   a control unit configured to:
      control rotation of the feed roller to move the received check from the insertion unit towards the at least one alignment roller by determining whether a dimension of the check in the direction of the feed path is shorter than the predetermined distance based on sensing of the first group of sensors and the second group of sensors,
      determine whether the aligned check is configured for reading by the check reading unit based on sensing of the third group of sensors, and
      cause the feed roller to rotate to return the check responsive to determining that the dimension of the check in the direction of the feed path is shorter than the predetermined distance.

2. The check deposit apparatus of claim 1, wherein the second group of sensors is further configured to sensewhether the check has a length shorter than the predetermined length in conjunction with the first group of sensors.

3. A check deposit apparatus comprising:
   an insertion unit receiving a check for depositing within the check deposit apparatus;
   a feed roller adjacent to the insertion unit and configured to convey the received check along a feed path;
   at least one alignment roller placed along the feed path subsequent to the feed roller and configured to align the check conveyed by the feed roller towards a side of the feed path;
   a check reading unit configured to read information from the check aligned by the alignment roller;
   a first group of sensors placed adjacent to the insertion unit at a side opposite to the feed roller, the first group of sensor configured to sense whether a length of the check is smaller than a predetermined length;
   a second group of sensors placed between the feed roller and the alignment roller at a predetermined distance from the first group of sensors in a direction of the feed path, the second group of sensor configured to sense whether a width of the check is smaller than a predetermined width;
   a third group of sensors placed in the feed path subsequent to the second group of sensors, wherein the third group of sensors is configured to sense a length and a width of the check aligned by the at least one alignment roller; and
   a control unit configured to:
      control rotation of the feed roller to move the received check from the insertion unit towards the at least one alignment roller by determining whether a dimension of the check in the direction of the feed path is shorter than the predetermined distance based on sensing of the first group of sensors and the second group of sensors,
      determine whether the aligned check is configured for reading by the check reading unit based on sensing of the third group of sensors, and
      determine the check as unreadable responsive to determining that the sensed length and the width of the check do not match predetermined dimensions.

4. The check deposit apparatus of claim 3, wherein the third group of sensors includes a reference sensor disposed at one side of the feed path, a first sensor spaced apart from the reference sensor by a predetermined length in a horizontal direction, and a second sensor spaced apart from the reference sensor by a predetermined width in a vertical direction.

5. The check deposit apparatus of claim 1, wherein at least one of the first, second and third groups of sensors include optical sensors to sense whether the check is formed of a single sheet or multiple sheets.

6. The check deposit apparatus of claim 3, wherein at least one of the first, second and third groups of sensors include optical sensors to sense whether the check is formed of a single sheet or multiple sheets.

* * * * *